July 5, 1955   R. G. PIETY   2,712,415
OPTICAL COMPUTER
Filed April 28, 1954   6 Sheets-Sheet 1
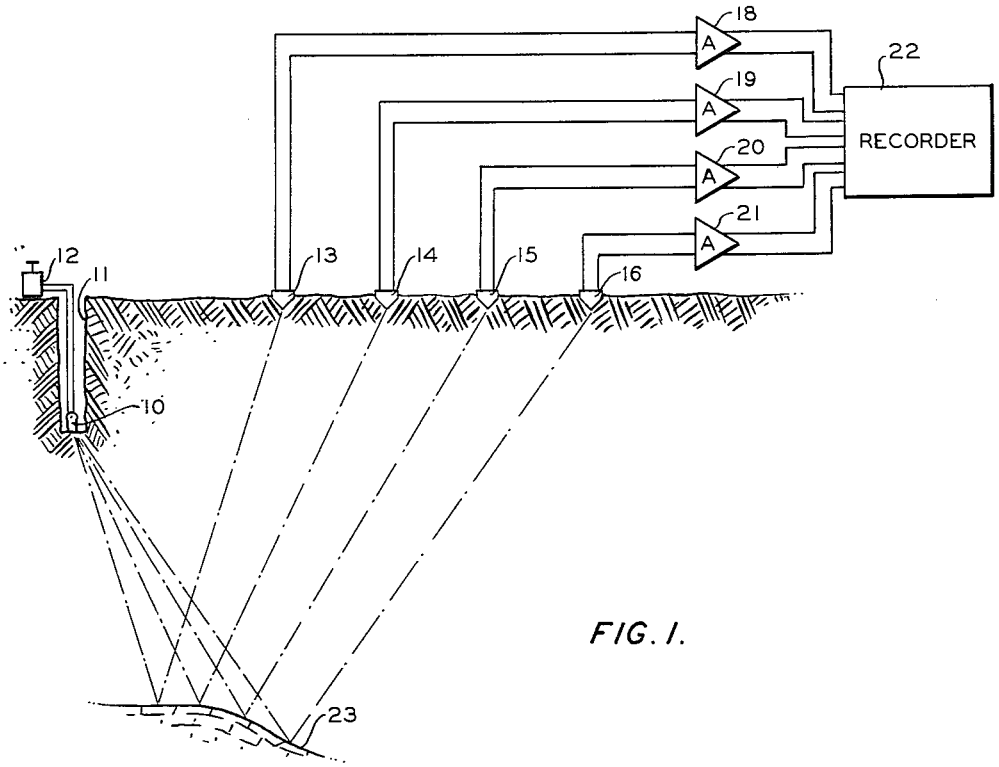
FIG. 1.
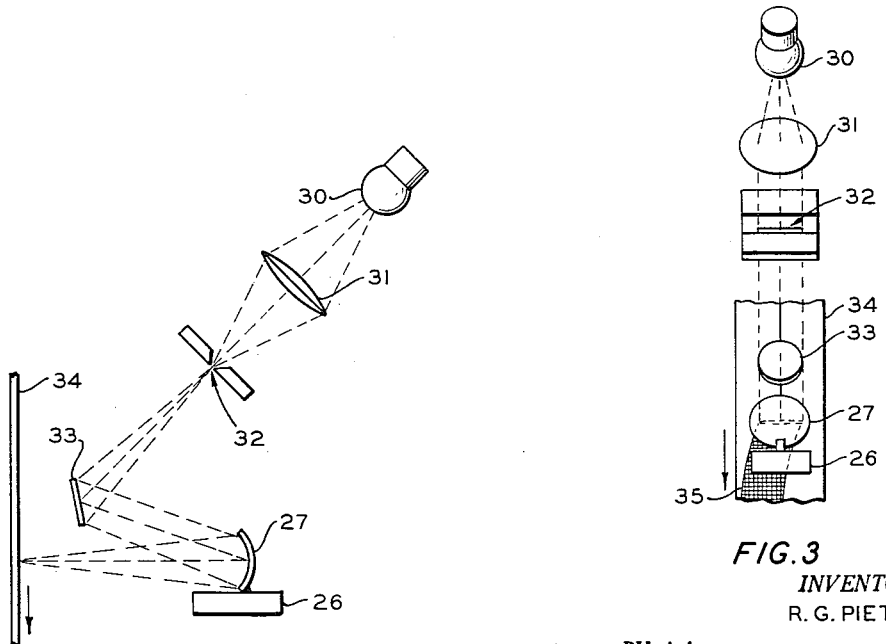
FIG. 2
FIG. 3
INVENTOR.
R. G. PIETY
BY Hudson & Young
ATTORNEYS July 5, 1955 R. G. PIETY 2,712,415
OPTICAL COMPUTER
Filed April 28, 1954 6 Sheets-Sheet 2

INVENTOR.
R.G. PIETY
BY Hudson & Young
ATTORNEYS

July 5, 1955  R. G. PIETY  2,712,415
OPTICAL COMPUTER

Filed April 28, 1954  6 Sheets-Sheet 3

INVENTOR.
R.G. PIETY
BY Hudson & Young
ATTORNEYS

July 5, 1955

R. G. PIETY 2,712,415

OPTICAL COMPUTER

Filed April 28, 1954

INVENTOR.
R. G. PIETY

BY *Hudson & Young*

ATTORNEYS

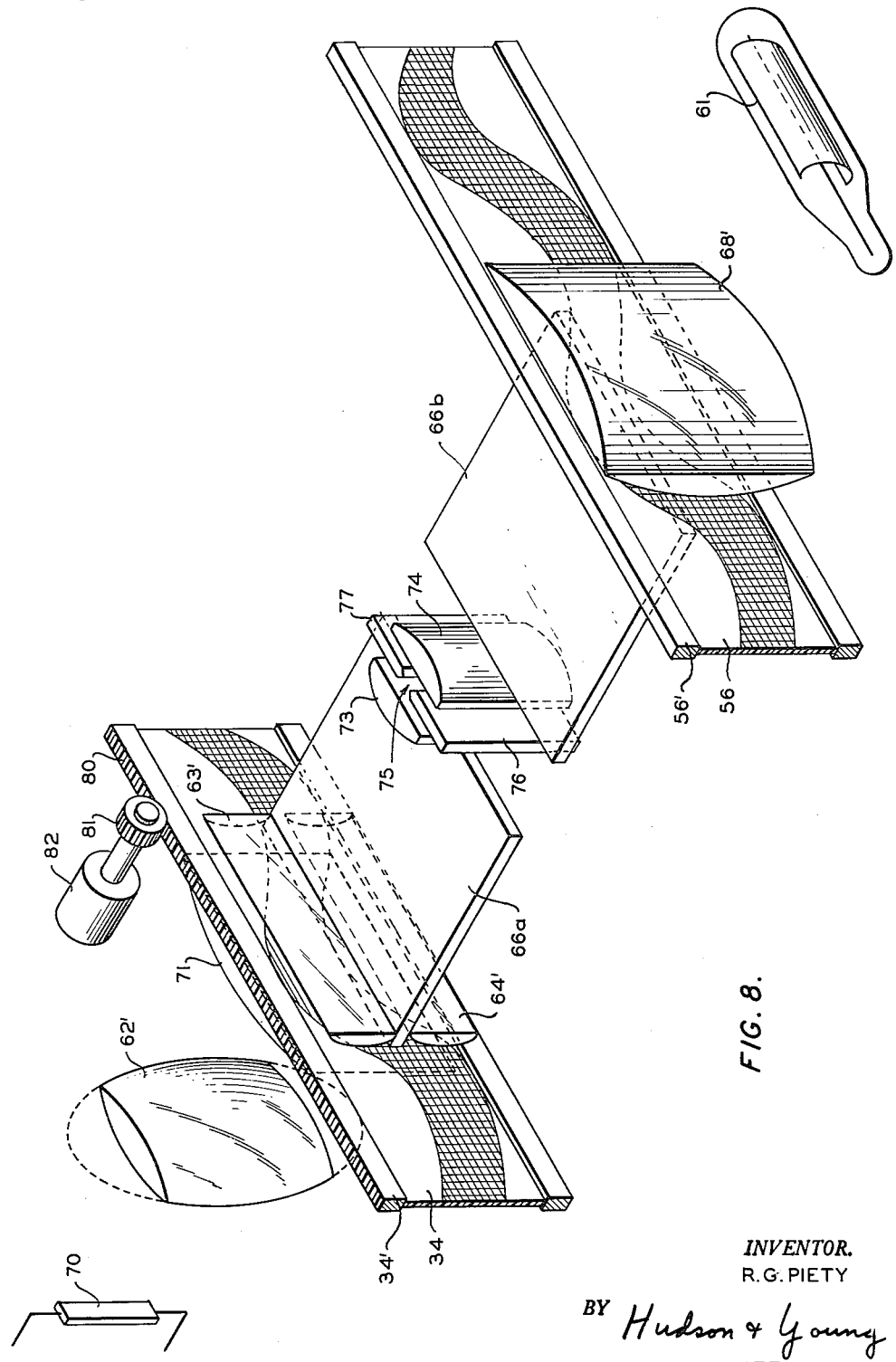

July 5, 1955 R. G. PIETY 2,712,415
OPTICAL COMPUTER
Filed April 28, 1954 6 Sheets-Sheet 6
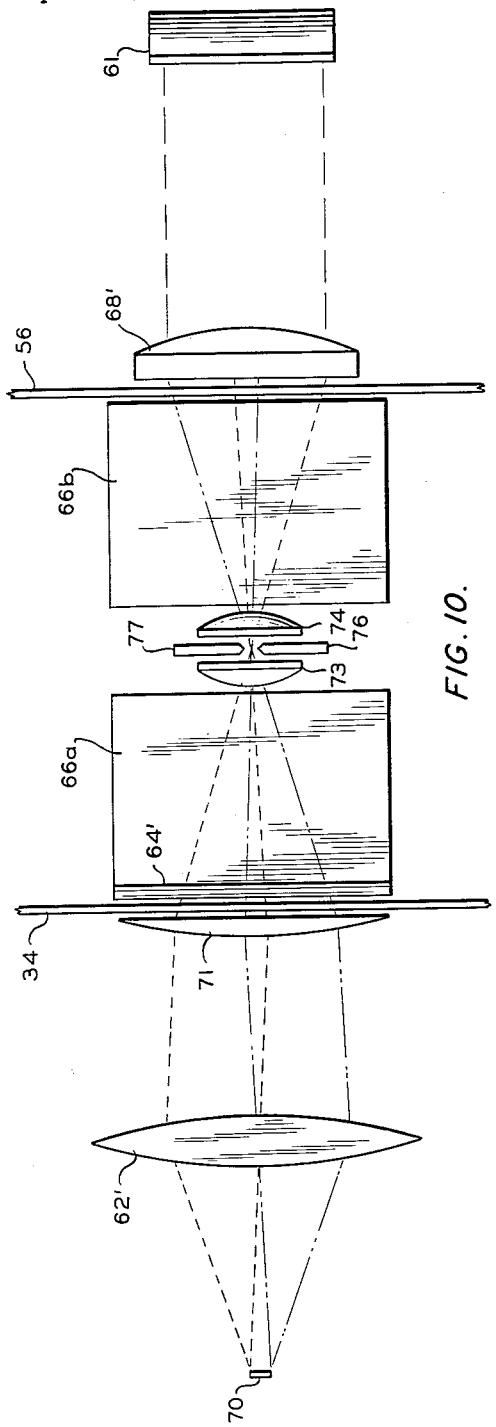
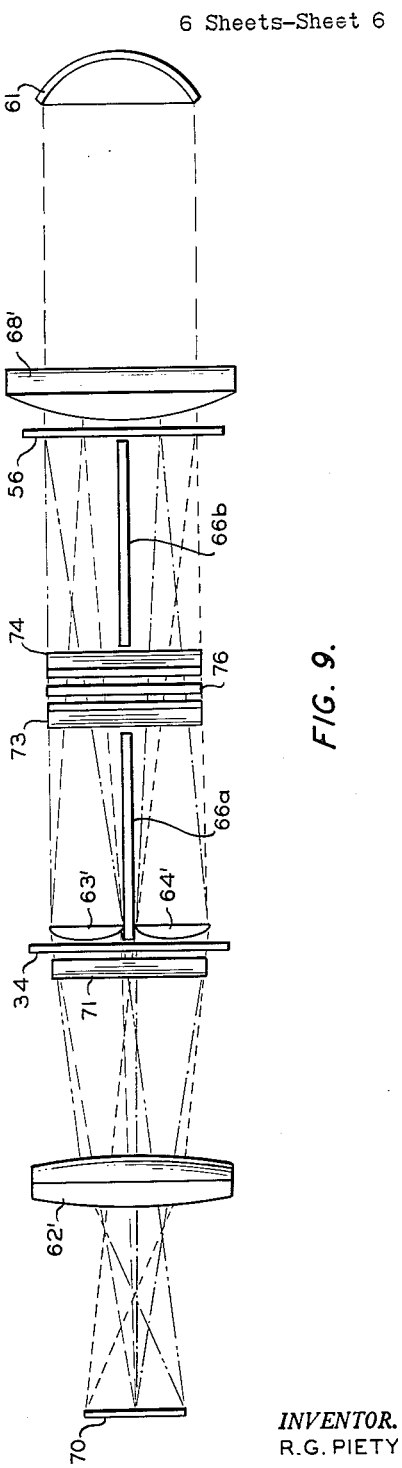
FIG. 10.
FIG. 9.
INVENTOR.
R.G. PIETY
BY Hudson & Young
ATTORNEYS

United States Patent Office 2,712,415
Patented July 5, 1955

2,712,415

OPTICAL COMPUTER

Raymond G. Piety, Bartlesville, Okla., assignor to Phillips Petroleum Company, a corporation of Delaware Application April 28, 1954, Serial No. 426,103

15 Claims. (Cl. 235—61)

This invention relates to optical computers. In one specific aspect it relates to apparatus for multiplying algebraically a plurality of functions. In another aspect it relates to apparatus for integrating the product of a plurality of functions over a predetermined interval.

In geophysical prospecting, valuable information can often be obtained concerning subsurface formations by seismic surveying. A plurality of vibration responsive devices is disposed at or near the surface of the earth in a predetermined geometric array and an explosive charge is detonated at or near the surface of the earth. Vibrations emitted from the explosive charge travel downwardly into the earth and are reflected or refracted by various formations back to the vibration responsive elements where they are recorded. The seismic signals thus recorded generally are complex waves having numerous components. However, the wave form produced by reflections from a discontinuity such as the interface between two formations can be identified with a considerable degree of accuracy by statistical analysis. If the individual reflections are spaced a considerable distance apart, then the wave form can readily be determined, and reflections from the same discontinuity can be traced from the records of the several seismometers in the unit. However, such a signal seldom if ever is received in actual practice. The recorded reflections normally are spaced so closely together that the reflection patterns from a number of discontinuities are superimposed to form a wave of complex character. Thus, the simple reflections which are referred to hereinafter as elementary events generally cannot be identified with any great degree of accuracy from an inspection of the seismic record alone. Moreover, the interpretation of these records is further complicated by the presence of interfering waves.

Various procedures have been devised to improve the usefulness of the recorded seismic records. These systems involve filters, tuning networks, seismometers of increased sensitivity, and methods of mixing signals from several seismometers to eliminate undesired vibrations. Although these techniques have greatly improved the usefulness of data obtained from seismic records, such records still yield insufficient information concerning elementary events to enable the records to be interpreted with the desired degree of accuracy. In my copending application Serial No. 162,986, filed May 19, 1950, there is disclosed a computing system wherein seismic signals are applied to a recording mechanism which produces a photographic record of the seismic signals on a transparent medium. The recorded signal can thus be considered to represent the mathematical relationship between time and the amplitude of the received seismic signal. This mathematical function is multiplied by a second predetermined mathematical function, which also is recorded on a transparent medium, and the resulting product is integrated over a predetermined interval to provide a transformed output. By proper choice of the second predetermined function, the seismometer output can be transformed in a manner equivalent to passing the seismometer output signal through an ideal electrical filter. Alternatively, the output signal from a seismometer can be multiplied by a preselected weighting function. Finally, the function representing the seismometer output can be correlated either with itself or with a function representing an ideal elementary event to determine the time of occurrence of the elementary event in the original seismometer signal.

The multiplication and integration of two signals by optical means can be performed by passing radiation through the two mediums and recording the transmitted radiation. However, such a procedure has been rather complicated in the past because multiplication of two positive quantities or two negative quantities yields a positive product whereas multiplication of a positive quantity by a negative quantity yields a negative product. Thus, in order to multiply and integrate functions having both positive and negative portions, it has been the practice to multiply the regions where both quantities are positive or negative separately from the regions where one function is positive and the other negative. The positive and negative products were then added to yield the algebraic product. In my copending application there is disclosed a system involving both variable area and variable density plates which are superimposed to allow two functions to be multiplied simultaneously irrespective of the sign of the functions.

In accordance with the present invention, there is provided an improved form of optical computer which is adapted to multiply and integrate two functions irrespective of the signs of the functions. Both functions are established as variable area light transmission plates. Radiation is transmitted through the two plates to a suitable detector. One beam of radiation is transmitted through the positive portions of the two functions and a separate beam of radiation is transmitted through the negative portions of the two functions. The resulting transmitted beams are combined to provide the algebraic product.

Accordingly, it is an object of this invention to provide an improved optical system for multiplying a plurality of functions.

Another object is to provide an optical system for multiplying a plurality of functions and integrating the product over a predetermined interval.

A further object is to provide apparatus for correlating a seismic record either with elementary events appearing in the record or with an ideal elementary event having a wave form determined from statistical considerations.

A still further object is to provide apparatus for transforming seismometer outputs.

Various other objects, advantages and features of this invention should become apparent from the following detailed description taken in conjunction with the accompanying drawing in which:

Figure 1 is a schematic representation of a seismic exploration system;

Figure 2 is a schematic view of the seismic signal recording apparatus;

Figure 3 is a second view of the seismic signal recording apparatus;

Figures 4, 4a, 4b, 4c, 4d and 4e are graphical representations of the multiplying system of this invention;

Figure 8 is a schematic view of a second embodiment of the optical computing apparatus of this invention;

Figure 9 is a view, partially in section, in a first plane of Figure 8; and

Figure 10 is a view in a second plane of Figure 8.

Figure 4:
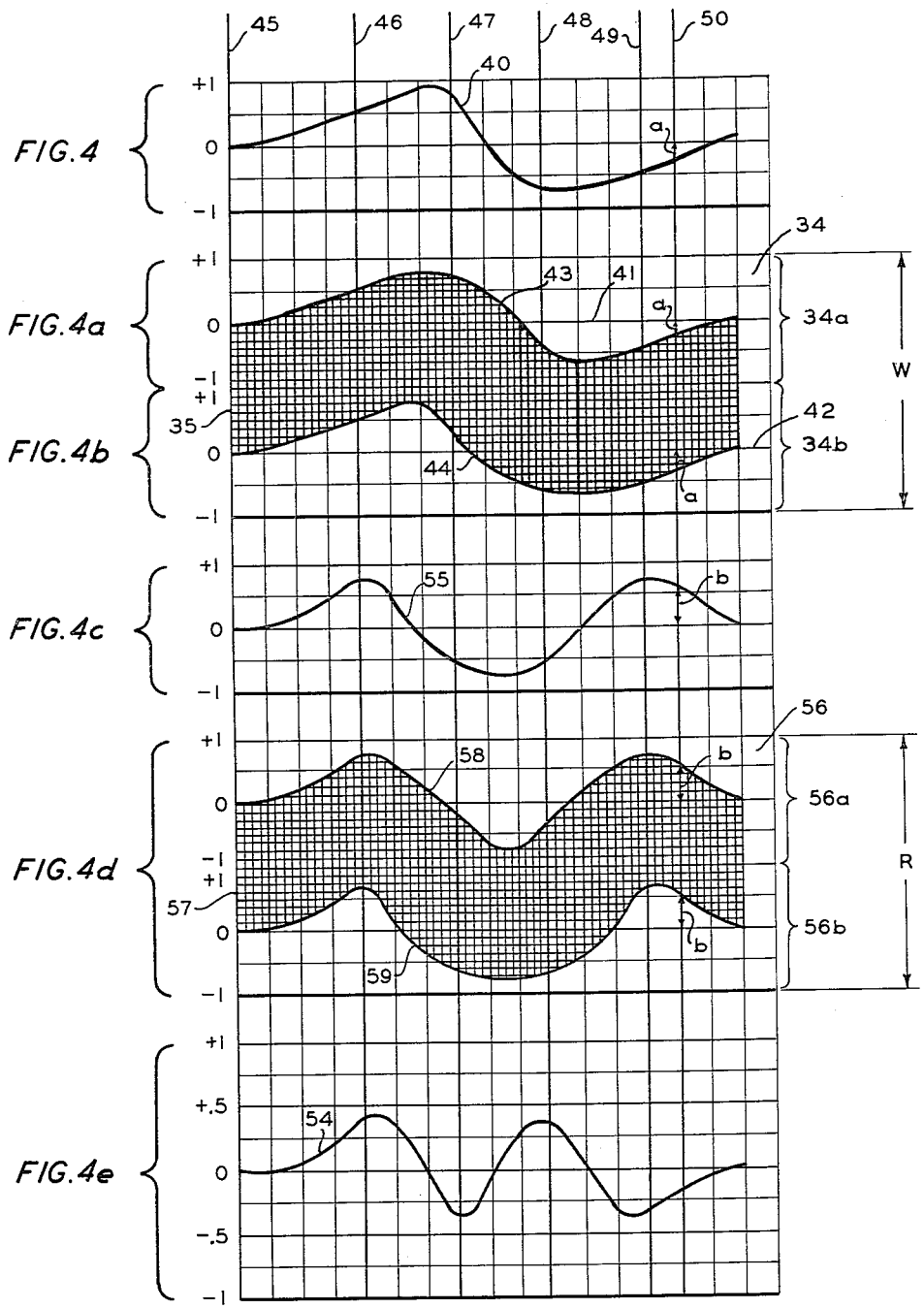

Referring now to the drawing in detail and to Figure 1 in particular, there is shown a seismic exploration system wherein an explosive charge 10 is positioned within a shot hole 11 and connected to a detonator 12. A series of seismometers 13, 14, 15 and 16 is embedded in the earth in a predetermined geometric array with respect to explosive charge 10. The output signals of these individual seismometers 13, 14, 15 and 16 are amplified by respective amplifiers 18, 19, 20 and 21 and recorded on separate channels in a multichannel recorder 22. Vibration waves emitted from explosive charge 10 travel downwardly into the earth and are reflected by formations such as indicated at 23. The reflected waves travel back to energize the several seismometers. The spacings between the seismometers and the total number of seismometers employed form no part of the present invention per se since the principles of this invention are adapted to any seismic exploration system.

In Figures 2 and 3 there is illustrated one channel of recorder 22. The output signal from amplifier 18, for example, is applied to a galvanometer 26 which supports a rotatable mirror 27, the position of mirror 27 being representative of the magnitude of the signal applied to galvanometer 26. The angular displacement of mirror 27 is thus proportional to the amplitude of the seismic signal detected at seismometer 13.

An optical recording system is provided in conjunction with galvanometer 26. This system includes a light source 30 and a lens 31 which condenses the light emitted from source 30 at an aperture 32. The light transmitted through aperture 32 is reflected by a mirror 33 to mirror 27 of galvanometer 26 and thence to a photographic plate 34. Aperture 32 is in the form of a narrow slit such that a thin pencil of light is reflected by mirrors 33 and 27 upon plate 34. The surface of plate 34 is coated with a photographic emulsion which is exposed by the light beam reflected from mirror 27. In the absence of a signal being applied to galvanometer 26, mirror 27 is biased such that the light beam is directed to the center portion of plate 34. When a signal of first polarity is applied to galvanometer 26, mirror 27 is rotated such that the light beam is displaced to one side of film 34 such as shown in Figure 3. In like manner, when a signal of second polarity is applied to galvanometer 26 the light beam is shifted from the center of plate 34 in an opposite direction. By restricting the angle through which mirror 27 moves, the linear displacement of the beam is nearly proportional to the amplitude of the signal applied to galvanometer 26. The amplitude of the recorded signals is adjusted so that the maximum signal received does not cause the light beam to move beyond either edge of plate 34. It is desired that the width of the light beam on plate 34 be one-half the width of plate 34.

During the recording period, plate 34 is moved longitudinally past the galvanometer at a predetermined speed. As a result, the beam of light reflected from mirror 27 produces, after development of the photographic emulsion, an opaque band 35 of width one-half the width of plate 34. This band is displaced laterally on plate 34 by an amount proportional to the magnitude of the signal received by the associated seismometer. Band 35 is illustrated in greater detail in Figures 4a and 4b.

In Figure 4 there is shown a graphical representation of a portion of the output signal 40 from amplifier 18 which is applied to galvanometer 26. The abscissa of this graph represents time and the ordinate represents the amplitude of the recorded vibrations. The band 35 in Figures 4a and 4b represents signal 40 as recorded on plate 34. For purposes of illustration, plate 34 is divided into two half-tracks 34a and 34b. The total width of plate 34 is represented by W. Upper half-track 34a is divided by a zero line 41 and lower half-track 34b is divided by a zero line 42. The upper boundary 43 of band 35 appears in half-track 34a in exactly the same relationship as curve 40 appears in Figure 4, and the lower boundary 44 of band 35 appears in half-track 34b in exactly the same relationship as curve 40 appears in Figure 4. The two boundaries 43 and 44 of band 35 thus define a curve which corresponds to the electrical signal being recorded. The vertical distance between boundaries 43 and 44 remains constant at one-half the width W of plate 34. Curve 40 is illustrated as having a zero value at a first abscissa 45. At this point, boundary 43 appears at the center of half-track 34b and boundary 44 appears at the center of half-track 34b. Band 35 thus covers each of the half-tracks 34a and 34b at the point representative of zero amplitude on curve 40. At a second abscissa 46, curve 40 has a positive value of 0.5 unit. At this point, band 35 covers three-fourths of half-track 34a and one-fourth of half-track 34b. Corresponding displacements can be observed for abscissas 47, 48 and 49. At a general abscissa 50, curve 40 is displaced below the zero axis a units.

In accordance with this invention, the function represented by the seismometer output 40 is multiplied by a predetermined function which can be represented by a curve 55 in Figure 4c, for example. This function 55 can represent the characteristic of an ideal electrical filter or an ideal elementary event as determined from statistical considerations. Alternatively, function 55 can represent a weighting function by which the output of the seismometer is to be multiplied. The weighted output can be mixed with the output of a second seismometer which can be a rotational seismometer responsive only to rotational earth movements and not to translational earth movements. In this latter example, the mixed output represents a wave from which components representative of ground roll or surface waves have been eliminated. In still another embodiment, the mixing can take place in the optical system of the computer. It should further be noted that where function 55 represents an ideal elementary event, the computing system described herein determines the correlation between this ideal elementary event and elementary events appearing on the original record even though several such events are superimposed. Where the function 55 represents a part of the original seismometer recording, the auto-correlation function is utilized to recognize wave forms which appear in selected portions of the recorded signal.

Function 55 is recorded as a band 57 on a photographic plate 56 which corresponds to plate 34. Plate 56 is divided into upper and lower half-tracks 56a and 56b. The relationship between curve 55 and band 57 is the same as relationship between curve 40 and band 35. The upper boundary 58 of curve 57 is of the same form as curve 55, and the lower boundary 59 of curve 57 is parallel to boundary 58 and displaced therefrom by a distance equal to one-half R, where R is the total width of plate 56. Curve 57 can be formed on plate 56 by recording apparatus such as shown in Figures 2 and 3 wherein an electrical signal of predetermined amplitude which represents curve 55 is applied to galvanometer 26.

Figure 5:
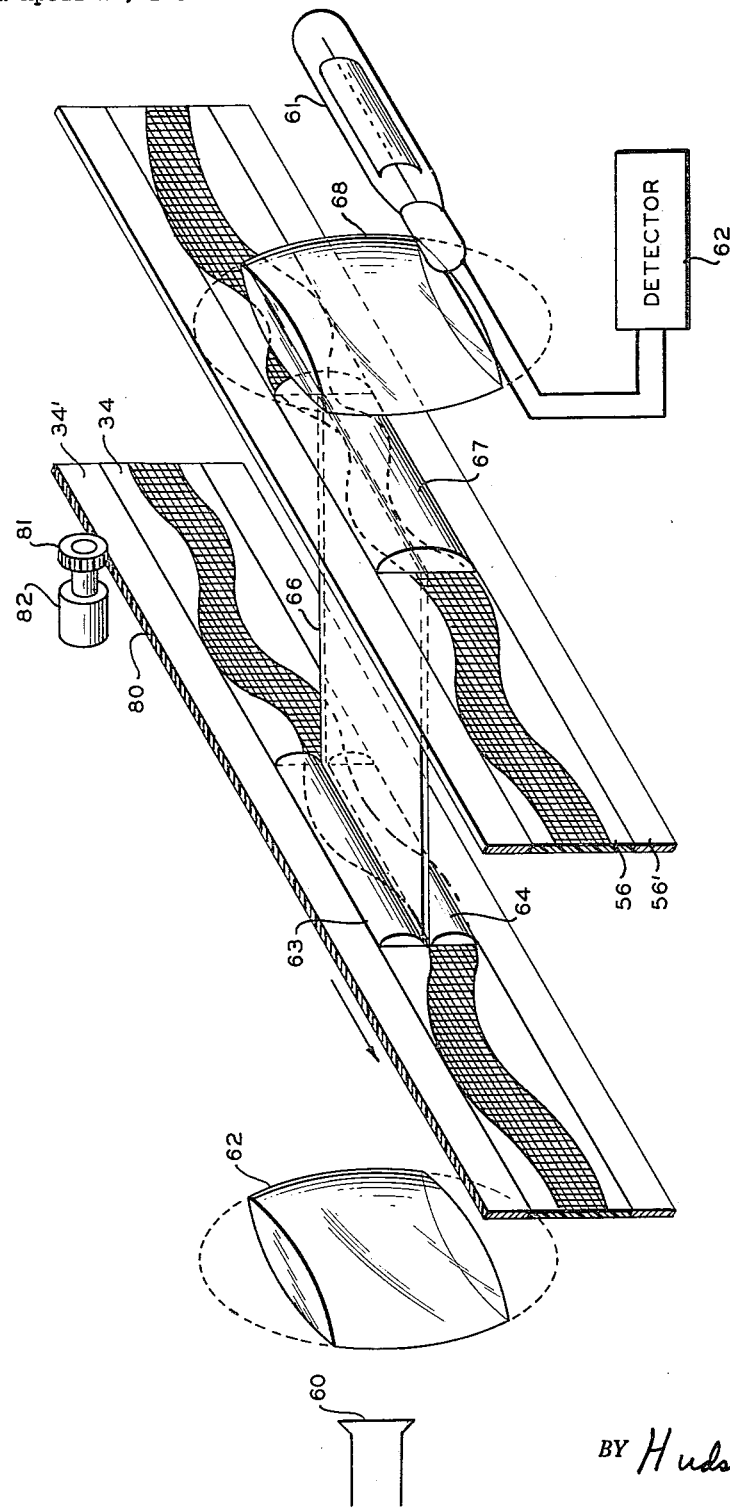
Figure 5 is a schematic view of a first embodiment of the optical computing apparatus of this invention.

The optical system shown in Figure 5 is employed to multiply functions 40 and 55 and integrate the product over a predetermined interval. Plates 34 and 56 are mounted in spaced parallel relation to one another by respective frames 34' and 56'. Plate 56 can be rigidly mounted while plate 34 is free to move longitudinally of axes 41 and 42. To this end, frame 34' is provided with a gear rack 80 which is engaged by a gear 81 that is rotated by a motor 82. Plate 56 can similarly be moved if desired. A source of light, which can be a wire filament 60 that is heated to incandescence, is mounted adjacent plate 34 such that light emitted from filament 60 is directed through plates 34 and 56 to impinge upon a radiation detecting element such as a photocell 61. The output signal from photocell 61 is applied to a suitable detector 62, which can be a continuous recorder. A first spherical lens 62 is interposed between filament 60 and plate 34. First and second cylindrical lenses 63 and 64 are mounted adjacent plate 34 on the side of plate 34 facing plate 56. These two lenses 63 and 64 are mounted such that their longitudinal axes are parallel to the direction of movement of plate 34. Lenses 63 and 64 are mounted side by side such that lens 63 covers half-track 34a of plate 34 and lens 64 covers half-track 34b. A thin light opaque barrier 66 is disposed between plates 34 and 56 to divide the spaces between the respective upper and lower half-tracks of the two plates. A pair of converging lenses, which can comprise a cylindrical lens 67 and a spherical lens 68, is disposed between plate 56 and photocell 61 to converge radiation transmitted through plate 56 onto photocell 61. As shown in Figure 5, lenses 62 and 68 are somewhat rectangular shaped. This arrangement has been found desirable when a plurality of seismometer signals are to be multiplied simultaneously. The removal of the edges of these lenses has nothing to do with the imaging, but does conserve space so that a plurality of traces can be recorded side by side on a single plate.

Figure 6:
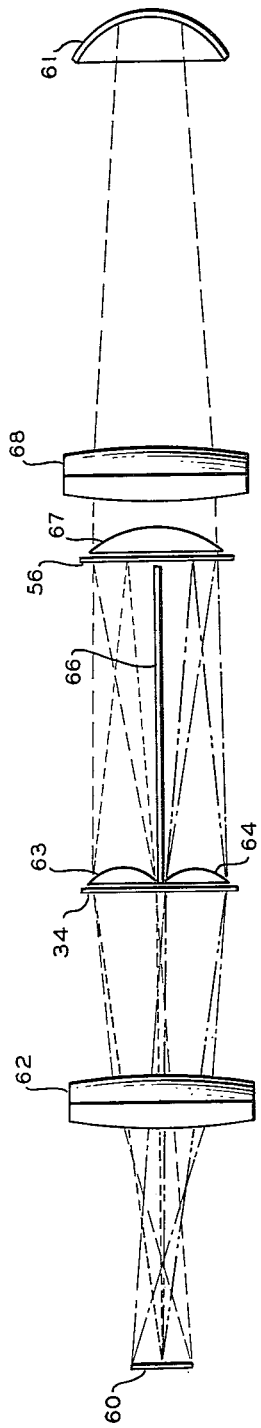
Figure 6 is a view, shown partially in section, in a first plane of Figure 5.
Figure 7:
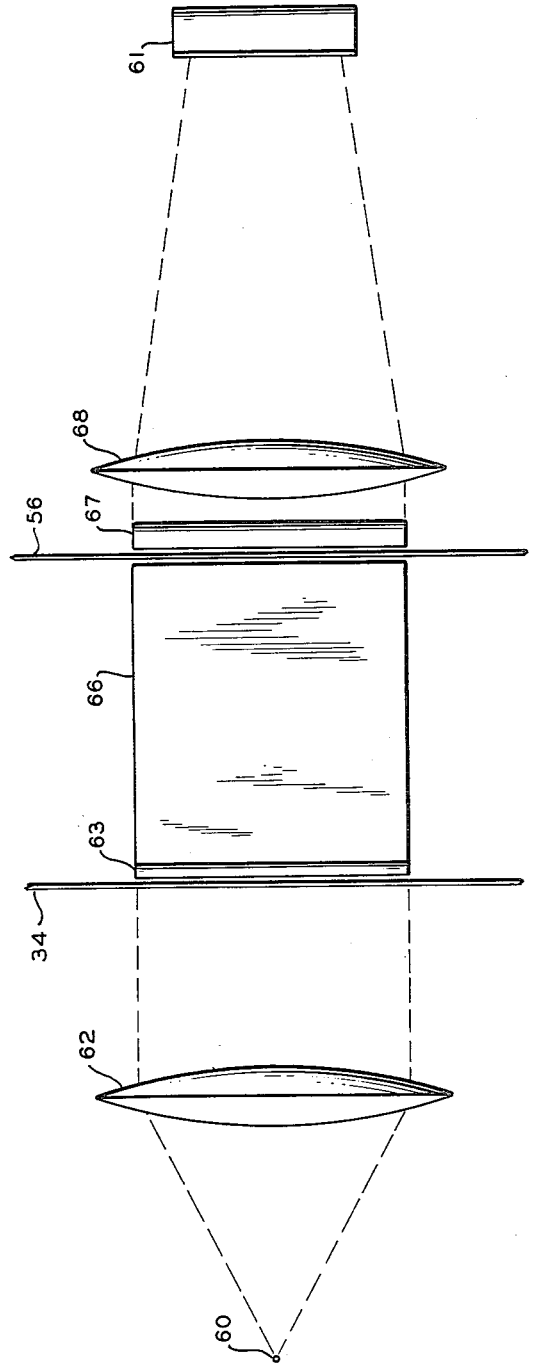
Figure 7 is a view in a second plane of Figure 5.

The operation of the optical system thus far described is illustrated in greater detail in Figures 6 and 7. Figure 6 represents a sectional view of Figure 5 in a vertical plane and Figure 7 represents a view of Figure 5 in a horizontal plane. These two planes are referred to as horizontal and vertical merely to simplify the following explanation. Furthermore, the use of the terms "upper" and "lower" in the claims to designate the half-zones are merely descriptive of the two zones and are not intended to designate direction. Because of the use of cylindrical lenses it is necessary to consider the imaging and the ray patterns in the horizontal and vertical planes separately. In the vertical plane illustrated in Figure 6, parallel pencils of light, which are also homocentric in planes perpendicular to the filament, impinge upon plate 34. These pencils of light are formed by condenser lens 62 from the light emitted from filament 60 which is in the focal plane of lens 62. The essential properties of these parallel pencils of light are that they all have a common aperture which is perpendicular to the main axis of the system, which is located in the plane of the first variable area plate 34, and which has a vertical height at least equal to the height of one half-track on plate 34. The cylindrical lenses 63 and 64 divide the incident beams into two halves which are focused in an identical manner.

The second variable area plate 56 is located in the focal plane of lenses 63 and 64. The light in each half of one of the parallel beams which impinges upon plate 34 from filament 60 is concentrated on a particular point in the vertical section through plate 56 in such a manner that the total of the light points, corresponding to the different beams, is a line of constant illumination. There are, of course, two such lines formed, one for each cylindrical lens. The center of the lines is the focal point of a beam that is parallel to the axis of the system. The upper end of the lines is the focal point of the beam that enters the aperture from below-left, and the lower end of the line is the focal point of the parallel beam that enters the aperture from above-left.

The height of band 35 on each half-track 34a and 34b of plate 34 determines the fraction of the total light in each of the parallel beams that is transmitted through plate 34. This transmitted light determines the illumination at each point in the vertical plane through plate 56. Each half-track 56a and 56b of plate 56 transmits a fraction of the light it receives in accordance with the height of band 57 on the particular half-track. The total light transmitted through plate 56 is condensed by lenses 67 and 68 on photocell 61.

In any horizontal plane, filament 60 is considered as a point source of light in the principal focal plane of lens 62. The light transmitted through lens 62 is thus in the form of parallel beams which remain parallel as the light passes through plate 34, lenses 63 and 64, plate 56 and lens 67. Lens 68 converges these beams to impinge upon photocell 61. In operation, the entire optical system is enclosed within a suitable housing, not shown, which prevents stray light from entering the system. Barrier 66 is employed to prevent the light transmitted through the upper half-tracks of plates 34 and 56 from mixing with the light transmitted through the lower half-tracks of these plates. In this manner the upper half-tracks, which represent positive values, are multiplied separately and the lower half-tracks, which represent negative values, are likewise multiplied separately. Lens 68 converges both beams of light on photocell 61 to add the two separate products.

The multiplication performed by the optical system of this invention can be explained from a consideration of Figures 4a, 4b, 4d and 4e. The total light transmitted through both plates is proportional to the algebraic product of tthe values of the two functions established on the respective plates. This should be evident from a study of the above-mentioned figures at ordinate 45 where both functions 40 and 55 are zero. Half-track 34a transmits a quantity of light proportional to one-half the light incident thereon and half-track 56a transmits a quantity of light proportional to one-half the total light incident thereon. The two upper half-tracks 34a and 56a superimposed transmit a quantity of radiation proportional to one-fourth the incident radiation. In like manner, the two lower half-tracks 34b and 56b in combination transmit a quantity of radiation proportional to one-fourth the total incident radiation. Thus, the total radiation transmitted to the photocell at ordinate 45 is the sum of the upper and lower transmissions which is one-half unit to correspond to a zero value for the multiplied functions. At the general abscissa 50, it will be assumed for purposes of illustration that the ordinate of function 40 is $a$ and the ordinate of function 56 is $b$. It also will be assumed that $w$ is a constant depending upon the width and inherent transmission characteristics of plate 34 while $r$ is a constant depending upon the width and inherent transmission characteristics of plate 56.

In particular, assuming plate 34 to be perfectly transparent and the exposed band 35 to be perfectly opaque, then at abscissa 50 the transparent portion of half-track 34a is $$\frac{W}{4} - a$$

units in length and the proportion of light transmitted therethrough is equal to $$\frac{\frac{W}{4} - a}{\frac{W}{2}} = \frac{1}{2}\left(-\frac{a}{w}\right)$$

where $w$ is equal to $$\frac{W}{4}$$

and W represents the total width of plate 34 which is four units. If the plate is not perfectly transparent, or if band 35 is not perfectly opaque, then there is a different constant of proportionality between W and $w$, but the relationship is otherwise unchanged. Similarly the proportion of light transmitted through the lower half-track 34b is $$\frac{1}{2}\left(1 + \frac{a}{w}\right)$$

In like manner, the proportion of light transmitted through the respective upper and lower half tracks 56a and 56b is $$\frac{1}{2}\left(1 - \frac{b}{r}\right)$$

and $$\frac{1}{2}\left(1 + \frac{b}{r}\right)$$

where R is the total width of plate 56, $r$ being equal to $$\frac{R}{4}$$

Due to the superimposed position of the plates 34 and 56, a portion of the light incident upon any given element of half-track 34a passes through a corresponding element of half-track 56a to photocell 61, the remainder of the light being absorbed by bands 35 and 57. Thus, the light passing through both upper half-tracks is representative of the product of the light transmitted through the individual upper half-tracks. This product is represented as $$\frac{1}{4}\left(1 - \frac{a}{w} - \frac{b}{r} + \frac{ab}{rw}\right)$$

Similarly, the light transmitted through the lower half-tracks is represented as $$\frac{1}{4}\left(1 + \frac{a}{w} + \frac{b}{r} + \frac{ab}{rw}\right)$$

These two products are added by cell 61 to provide a voltage representative of a constant plus the sum of the functions times a second constant, i. e., $$\frac{1}{2}\left(1 + \frac{ab}{rw}\right)$$

The difference between this product and the zero reference value of $$\frac{1}{2} \text{ is } \frac{ab}{2rw}$$

which when multiplied by the constant 2 gives $$\frac{ab}{rw}$$

The final transmission term $$\frac{ab}{rw}$$

is numerically equal to the product of the factors $a$ and $b$, modified only by the transmission constants $r$ and $w$. When recorder 62 is calibrated properly, the output signal represents the product of $a$ and $b$. The above-described multiplication is summarized in the following table, $r$ and $w$ each being unity.

| | General Ordinate | Ordinates | | | |
|---|---|---|---|---|---|
| | | 46 | 47 | 48 | 49 |
| $f(x)$ | $a$ | 0.5 | 0.8 | −0.7 | −0.5 |
| Half-track 34a | $\frac{1}{2}\left(1 - \frac{a}{w}\right)$ | 0.25 | 0.1 | 0.85 | 0.75 |
| Half-track 34b | $\frac{1}{2}\left(1 + \frac{a}{w}\right)$ | 0.75 | 0.9 | 0.15 | 0.25 |
| $g(x)$ | $b$ | 0.8 | −0.6 | −0.5 | 0.8 |
| Half-track 56a | $\frac{1}{2}\left(1 - \frac{b}{r}\right)$ | 0.1 | 0.8 | 0.75 | 0.1 |
| Half-track 56b | $\frac{1}{2}\left(1 + \frac{b}{w}\right)$ | 0.9 | 0.2 | 0.25 | 0.9 |
| Product (34a) (56a) | $\frac{1}{4}\left(1 - \frac{a}{w} - \frac{b}{w} + \frac{ab}{rw}\right)$ | 0.025 | 0.08 | 0.638 | 0.075 |
| Product (34b) (56b) | $\frac{1}{4}\left(1 + \frac{a}{w} + \frac{b}{r} + \frac{ab}{rw}\right)$ | 0.675 | 0.18 | 0.037 | 0.225 |
| Sum of products | $\frac{1}{2}\left(1 + \frac{ab}{rw}\right)$ | 0.7 | 0.26 | 0.675 | 0.3 |
| Reference | $\frac{1}{2}$ | 0.5 | 0.5 | 0.5 | 0.5 |
| Difference between sum of products and reference. | $\frac{ab}{2rw}$ | 0.2 | −0.24 | 0.175 | −0.2 |
| Difference doubled | $\frac{ab}{2rw}$ | 0.4 | −0.48 | 0.35 | −0.4 |
| $f(x) \cdot g(x)$ | $ab$ | 0.4 | −0.48 | 0.35 | −0.4 |

Curve 54 in Figure 4e represents the product of $a$ and $b$.
In Figure 8, there is shown a second form of the optical computer wherein wire filament 60 is replaced by a flat plate filament 70. Filament 70 will be referred to as an area-source filament because of the definite area presented in both the horizontal and vertical planes. This second optical system is generally similar to that shown in Figure 5 and corresponding parts are designated by like primed reference numerals. A cylindrical lens 71 is disposed between spherical lens 62' and plate 34. The axis of lens 71 is perpendicular to the axes of lenses 63' and 64'. There is no lens in the system of Figure 8 which corresponds to lens 67 in Figure 5. Horizontal barrier 66 is replaced by a pair of horizontal barriers 66a and 66b having an opening therebetween. Disposed within this opening is a slit-lens arrangement which comprises a pair of converging cylindrical lenses 73 and 74 which are separated by a vertical slit 75 that is defined by a pair of opposing plates 76 and 77. The axes of lenses 73 and 74 are perpendicular to the axes of lenses 63' and 64'. A compound cylindrical lens 68' replaces lens 68.

In the vertical plane illustrated in Figure 9, the optics are similar to the line source optics shown in Figure 6. The addition of cylindrical lenses 71, 73 and 74 influences the light paths in the vertical plane only as much as glass plates of corresponding thickness and refractive index would influence the light paths.

In the horizontal plane illustrated in Figure 10, the light emitted from source 70 is converted into parallel pencils of light by lens 62'. Filament 70 is disposed in the focal plane of lens 62'. Cylindrical lenses 63' and 64' form images of the half tracks of plate 34 on plate 56. However, these images are rotated 180° around the vertical axis by slit 75 and lenses 73 and 74. The lenses 73 and 74 have nothing to do with the transformation of the variable area plate 34 into a variable density image, this being accomplished solely by the lenses 63' and 64' in the vertical plane. Lenses 73 and 74 serve merely to form the turned image and to keep it on the same scale. It is therefore necessary that plates 34 and 56 be maintained in conjugate planes with respect to the lenses 73 and 74 so that the focal points of these lenses are halfway between the plates and the lenses.

Double cylindrical lens 68' collects all the light transmitted through plate 56 and focuses this light on photocell 61. Since the beams in the horizontal plane are approximately as divergent as the beams in the vertical plane, the double cylindrical lens 68' is provided. A spherical lens can be used for this purpose. From a comparison of the two optical systems it can be seen there is practically no difference in the vertical plane. In the line source optics of Figure 5 there is a point source in any horizontal plane. Each point on the first variable area plate 34 is imaged on the second variable area plate 56 by one ray. This implies that the light coming from a point on the first variable area plate is distributed over the second variable area plate according to a diffraction pattern. Since all such patterns coming from adjacent points on the first variable area plate are overlapping, an actual diffraction pattern is not observed, but the light distribution is influenced. In the area source optics of Figure 8, each point on the first variable area plate is imaged on the second variable area plate by a pencil of light. This pencil subtends a certain angle. The wider this angle, the better is the resolving power of the system. This is equivalent to stating that disturbance from diffraction patterns diminishes as the imaging bundle increases.

It will be understood that a similar optical system is provided for each seismograph when the apparatus of this invention is utilized in seismic work. In this manner, the output of each seismometer is analyzed to determine when elementary events occur therein, thus enabling the total record to be analyzed with a much greater degree of accuracy than has heretofore been possible. In a practical seismograph recording system, the seismometers are arranged at different distances from the shot point. Thus, the reflections from a given discontinuity appear later in time upon the seismometers further removed from the shot point, this displacement being referred to as "step-out." This invention enables the angle of dip of formation to be determined with a great degree of accuracy.

In another aspect of the invention, the functions recorded on the variable density plates may be mathematical functions representing the transformations produced by an ideal electrical filter. In this case, the output of the photoelectric cell for each set of tracks is proportional to the original seismometer output as modified by the ideal electrical filter. Furthermore, if the output of one seismometer is recorded upon the variable area plate and the output of another seismometer is recorded on the variable density plate, the output of the photoelectric cell represents the combined or mixed outputs of the two seismometers.

Under actual operating conditions, the output of the seismic apparatus is the result of a multitude of effects of various origins. The initial shot sends out a dilational wave, a shear wave and a surface wave. The dilational wave is used in standard methods of prospecting, while the shear wave is considered objectionable at present, and the surface wave is objectionable and will remain so, since it is propagated through the surface layers and is not influenced by structures below the surface. The wind causes objectionable ground motion by blowing against trees, rocks, fences and by blowing over the surface itself. The seismometers measure certain components of the resultant of all these motions.

The dominant frequency of the surface waves varies between 5 and 30 cycles per second, and the dominant frequency of the reflected dilational wavelets varies from 20 to 70 cycles per second. The wind gives components over the entire useful frequency range. By transforming the seismograph record in a manner equivalent to operating upon it with an ideal electrical filter, the components representative of surface waves are substantially eliminated, and the signal to noise ratio over random disturbances, such as wind, is greatly improved.

Alternatively, the procedure can consist of making a recording, determining the shape of its elementary event from the auto-correlation function computed by this computer, and transforming the recording subsequently into a record such as would have been obtained if a tuning with ideal impulsive response had been used. This last operation is again performed by the reproducer.

Moreover, the important problem of synthesizing an ideal record where the sub-surface stratification is known or assumed, can be solved by the computer of this invention. If the sub-surface stratification is known, the theoretical disposition of the elementary events on the record can be computed. Unit impulses are placed on these calculated spots and this record is impressed upon one of the plates while the second plate has the elementary event recorded thereon. A record is obtained that consists of a sum of elementary events, each in its correct position, which is an ideal record for the assumed or known subsurface stratification.

Although the computer has been described primarily in connection with seismic work, it is extremely useful in other applications. For example, it has been explained that any equation of the form $$P = \int_0^T f(x-t)g(x)dx$$

can be solved by recording the functions and combining them with the optical apparatus of this invention. By merely reversing the direction of movement of the plate 34, the solution to the following equation can be obtained $$P = \int_0^T f(x+t)g(x)dx$$

Furthermore, by turning the plate 34 through an angle of 180 degrees and then moving it past plate 56, the solution to the following equation is obtained.

$$P = \int_0^T f(t-x)g(x)dx$$

Equations of this type, which include the folding integral, the cross-correlation function, the auto-correlation function, the Duhamel integral and other similar equations, are important in network and mathematical theory and in many practical computations, the solutions to these equations having heretofore required long and tedious hand computation. It is contemplated that the variable density plate can have, in addition to the density changes produced by the recording system, a preselected density gradient, such as progressive density gradient proceeding from one side to the other side of the track. This has the effect of accentuating positive peaks and depressing negative peaks in the signal to be recorded or, alternatively, of increasing the negative peaks and decreasing the positive peaks.

While the invention has been described in connection with present, preferred embodiments thereof, it should be apparent that the invention is not limited thereto.

What is claimed is:

1. Apparatus for multiplying algebraically two functions which comprises, in combination; a first plate of radiation-transmitting material having an upper zone and a lower zone, the radiation transmission characteristics of the upper zone varying, with respect to a reference transmission, in accordance with a first function, the radiation transmission characteristics of the lower zone varying, with respect to a reference transmission, in accordance with the negative of said first function; a second plate of radiation-transmitting material having an upper zone and a lower zone, the radiation transmission characteristics of the upper zone varying, with respect to a reference transmission in accordance with a second function, the radiation transmission characteristics of the lower zone varying, with respect to a reference transmission in accordance with the negative of said second function; a source of radiation; a radiation detector; means to direct a first beam of radiation from said source through the upper zones of said first and second plates to said detector; means to direct a second beam of radiation from said source through the lower zones of said first and second plates to said detector; and a light opaque plate disposed between said first and second plates to separate said first and second beams between said first and second plates.

2. The combination in accordance with claim 1 further comprising means to move said first plate relative to said second plate whereby said first beam continues to be directed through upper zones of both of said plates and said second beam continues to be directed through lower zones of both of said plates.

3. Apparatus for multiplying algebraically two functions which comprises, in combination; a first plate of radiation-transmitting material having an upper zone and a lower zone, the radiation transmission characteristics of the upper zone varying, with respect to a reference transmission, in accordance with a first function, the radiation transmission characteristics of the lower zone varying, with respect to a reference transmission, in accordance with the negative of said first function; a second plate of radiation-transmitting material having an upper zone and a lower zone, the radiation transmission characteristics of the upper zone varying, with respect to a reference transmission in accordance with a second function, the radiation transmission characteristics of the lower zone varying, with respect to a reference transmission in accordance with the negative of said second function; said plates being positioned in spaced relation with one another whereby the planes of said plates are parallel and a common plane dividing the upper and lower zones of both of said plates is perpendicular to the planes of said plates; a source of radiation spaced from said first plate; a first lens positioned between said source and said first plate to direct a plurality of beams of radiation through said first plate; a first cylindrical lens positioned adjacent the upper zone of said first plate to focus radiation transmitted through the upper zone of said first plate on the upper zone of said second plate, the axis of said first cylindrical lens being parallel to said common plane; a second cylindrical lens positioned adjacent the lower zone of said first plate to focus radiation transmitted through the lower zone of said first plate on the lower zone of said second plate; and means to measure the total radiation transmitted through said second plate.

4. The combination in accordance with claim 3 wherein said last-mentioned means comprises a radiation detector and a converging lens to focus radiation transmitted through both said upper and lower zones of said second plate on said detector.

5. Apparatus for multiplying algebraically two functions which comprises, in combination; a first plate of radiation-transmitting material having an upper zone and a lower zone, the radiation transmission characteristics of the upper zone varying, with respect to a reference transmission, in accordance with a first function, the radiation transmission characteristics of the lower zone varying, with respect to a reference transmission, in accordance with the negative of said first function; a second plate of radiation-transmitting material having an upper zone and a lower zone, the radiation transmission characteristics of the upper zone varying, with respect to a reference transmission, in accordance with a second function, the radiation transmission characteristics of the lower zone varying, with respect to a reference transmission, in accordance with the negative of said second function; said plates being positioned in spaced relation with one another whereby the planes of said plates are parallel and a common plane dividing the upper and lower zones of both of said plates is perpendicular to the planes of said plates; a line source of radiation spaced from said first plate, said line being perpendicular to said common plane; a first spherical lens positioned between said source and said first plate whereby said source is in the focal plane of said first spherical lens; a first cylindrical lens positioned adjacent the upper zone of said first plate to focus radiation transmitted through the upper zone of said first plate on the upper zone of said second plate, the axis of said first cylindrical lens being parallel to said common plane; a second cylindrical lens positioned adjacent the lower zone of said first plate to focus radiation transmitted through the lower zone of said first plate on the lower zone of said second plate; a third cylindrical lens positioned adjacent the upper and lower zones of said second plate to converge radiation transmitted through both zones of said second plate, the axis of said third cylindrical lens being in said common plane; a radiation detector; a second spherical lens positioned between said second plate and said detector; and a light opaque plate positioned between said first and second plates, the plane of said light opaque plate being said common plane.

6. Apparatus for multiplying algebraically two functions which comprises, in combination; a first plate of radiation-transmitting material having an upper zone and a lower zone, the radiation transmission characteristics of the upper zone varying, with respect to a reference transmission, in accordance with a first function, the radiation transmission characteristics of the lower zone varying, with respect to a reference transmission, in accordance with the negative of said first function; a second plate of radiation-transmitting material having an upper zone and a lower zone, the radiation transmission characteristics of the upper zone varying, with respect to a reference transmission, in accordance with a second function, the radiation transmission characteristics of the lower zone varying, with respect to a reference transmission in accordance with the negative of said second function; said plates being positioned in spaced relation with one another whereby the planes of said plates are parallel and a common plane dividing the upper and lower zones of both of said plates is perpendicular to the planes of said plates; a source of radiation spaced from said first plate; a first lens positioned between said source and said first plate to direct a plurality of beams of radiation toward said first plate; a first cylindrical lens positioned adjacent the upper zone of said first plate to focus radiation transmitted through the upper zone of said first plate on the upper zone of said second plate, the axis of said first cylindrical lens being parallel to said common plane; a second cylindical lens positioned adjacent the lower zone of said first plate to focus radiation transmitted through the lower zone of said first plate on the lower zone of said second plate; a line aperture positoned between said first and second plates, the line of said aperture being perpendicular to said common plane; a third cylindrical lens positioned adjacent said first plate to focus radiation transmitted through said first plate through said aperture, the axis of said third cylindrical lens being perpendicular to said common plane; and means to measure the total radiation transmitted through said second plate.

7. Apparatus for multiplying algebraically two functions which comprises, in combination; a first plate of radiation-transmitting material having an upper zone and a lower zone, the radiation transmission characteristics of the upper zone varying, with respect to a reference transmission, in accordance with a first function, the radiation transmission characteristics of the lower zone varying, with respect to a reference transmission, in accordance with the negative of said first function; a second plate of radiation-transmitting material having an upper zone and a lower zone, the radiation transmission characteristics of the upper zone varying, with respect to a reference transmission, in accordance with a second function, the radiation transmission characteristics of the lower zone varying, with respect to a reference transmission, in accordance with the negative of said second function; said plates being positioned in spaced relation with one another whereby the planes of said plates are parallel and a common plane dividing the upper and lower zones of both of said plates is perpendicular to the planes of said plates; a rectangular source of radiation spaced from said first plate; a first spherical lens positioned between said source and said first plate whereby said source is in the focal plane of said first spherical lens; a first cylindrical lens positioned adjacent the upper zone of said first plate to focus radiation transmitted through the upper zone of said first plate on the upper zone of said second plate, the axis of said first cylindrical lens being parallel to said common plane; a second cylindrical lens positioned adjacent the lower zone of said first plate to focus radiation transmitted through the lower zone of said first plate on the lower zone of said second plate; a line aperture positioned between said first and second plates, the line of said aperture being perpendicular to said common plane; a third cylindrical lens positioned adjacent said first plate to focus radiation transmitted through said first plate through said aperture, the axis of said third cylindrical lens being perpendicular to said common plane; a radiation detector; a converging lens positioned adjacent said second plate to focus radiation transmitted through said second plate on said detector; and a light opaque plate positioned between said first plate and said second plate, the plane of said light opaque plate being said common plane.

8. The combination in accordance with claim 7 further comprising fourth and fifth cylindrical lenses positioned adjacent and on opposite sides of said aperture, the axes of said fourth and fifth lenses being perpendicular to said common plane.

9. Apparatus for multiplying algebraically two functions which comprises, in combination; a first plate of radiation-transmitting material divided into upper and lower longitudinally extending adjacent zones, said first plate having a band of radiation absorbing material thereon, said band being displaced laterally on said first plate in accordance with the values of a first function; a second plate of radiation-transmitting material divided into upper and lower longitudinally extending adjacent zones, said second plate having a band of radiation absorbing material thereon, said band being displaced laterally on said second plate in accordance with the values of a second function; a source of radiation; a radiation detector; means to direct a first beam of radiation from said source through the upper zones of said first and second plates to said detector; means to direct a second beam of radiation from said source through the lower zones of said first and second plates to said detector; and a light opaque plate disposed between said first and second plates to separate said first and second beams between said first and second plates.

10. Apparatus for multiplying algebraically two functions which comprises, in combination; a first plate of radiation-transmitting material divided into upper and lower longitudinally extending adjacent zones, said first plate having a band of radiation absorbing material thereon, said band being displaced laterally on said first plate in accordance with the values of a first function; a second plate of radiation-transmitting material divided into upper and lower longitudinally extending adjacent zones, said second plate having a band of radiation absorbing material thereon, said band being displaced laterally on said second plate in accordance with the values of a second function; said plates being positioned in spaced relation with one another whereby the planes of said plates are parallel and a common plane dividing the upper and lower zones of both of said plates is perpendicular to the planes of said plates; a source of radiation spaced from said first plate; a first lens positioned between said source and said first plate to direct a plurality of beams of radiation through said first plate; a first cylindrical lens positioned adjacent the upper zone of said first plate to focus radiation transmitted through the upper zone of said first plate on the upper zone of said second plate, the axis of said first cylindrical lens being parallel to said common plane; a second cylindrical lens positioned adjacent the lower zone of said first plate to focus radiation transmitted through the lower zone of said first plate on the lower zone of said second plate; and means to measure the total radiation transmitted through said second plate.

11. Apparatus for multiplying algebraically two functions which comprises, in combination; a first plate of radiation-transmitting material divided into upper and lower longitudinally extending adjacent zones, said first plate having a band of radiation absorbing material thereon, said band being displaced laterally on said first plate in accordance with the values of a first function; a second plate of radiation-transmitting material divided into upper and lower longitudinally extending adjacent zones, said second plate having a band of radiation absorbing material thereon, said band being displaced laterally on said second plate in accordance with the values of a second function; said plates being positioned in spaced relation with one another whereby the planes of said plates are parallel and a common plane dividing the upper and lower zones of both of said plates is perpendicular to the planes of said plates; a source of radiation spaced from said first plate; a first lens positioned between said source and said first plate to direct a plurality of beams of radiation toward said first plate; a first cylindrical lens positioned adjacent the upper zone of said first plate to focus radiation transmitted through the upper zone of said first plate on the upper zone of said second plate, the axis of said first cylindrical lens being parallel to said common plane; a second cylindrical lens positioned adjacent the lower zone of said first plate to focus radiation transmitted through the lower zone of said first plate on the lower zone of said second plate; a line aperture positioned between said first and second plates, the line of said aperture being perpendicular to said common plane; a third cylindrical lens positioned adjacent said first plate to focus radiation transmitted through said first plate through said aperture, the axis of said third cylindrical lens being perpendicular to said common plane; and means to measure the total radiation transmitted through said second plate.

12. An optical computer comprising, in combination; a first plate of radiation transmitting material divided into first and second longitudinally extending adjacent zones; a second plate of radiation transmitting material divided into first and second longitudinally extending adjacent zones; said first and second plates being positioned in spaced relation with one another whereby the planes of said plates are parallel and a common plane dividing the first and second zones of both of said plates is perpendicular to the planes of said plates; a source of radiation; a radiation detector; means to direct a first beam of radiation from said source through the first zones of said first and second plates to said detector; means to direct a second beam of radiation from said source through the second zones of said first and second plates to said detector; and a light opaque plate disposed between said first and second plates to separate said first and second beams between said first and second plates.

13. An optical computer comprising, in combination; a first plate of radiation transmitting material divided into first and second longitudinally extending adjacent zones; a second plate of radiation transmitting material divided into first and second longitudinally extending adjacent zones; said first and second plates being positioned in spaced relation with one another whereby the planes of said plates are parallel and a common plane dividing the first and second zones of both of said plates is perpendicular to the planes of said plates; a line source of radiation spaced from said first plate, said line being perpendicular to said common plane; a first spherical lens positioned between said source and said first plate whereby said source is in the focal plane of said first spherical lens; a first cylindrical lens positioned adjacent the first zone of said first plate to focus radiation transmitted through the first zone of said first plate on the first zone of said second plate, the axis of said first cylindrical lens being parallel to said common plane; a second cylindrical lens positioned adjacent the second zone of said first plate to focus radiation transmitted through the second zone of said first plate on the second zone of said second plate; a third cylindrical lens positioned adjacent the first and second zones of said second plate to converge radiation transmitted through both zones of said second plate, the axis of said third cylindrical lens being in said common plane; a radiation detector; a second spherical lens positioned between said second plate and said detector; and a light opaque plate positioned between said first and second plates, the plane of said light opaque plate being said common plane.

14. An optical computer comprising, in combination; a first plate of radiation transmitting material divided into first and second longitudinally extending adjacent zones; a second plate of radiation transmitting material divided into first and second longitudinally extending adjacent zones; said first and second plates being positioned in spaced relation with one another whereby the planes of said plates are parallel and a common plane dividing the first and second zones of both of said plates is perpendicular to the planes of said plates; a rectangular source of radiation spaced from said first plate; a first spherical lens positioned between said source and said first plate whereby said source is in the focal plane of said first spherical lens; a first cylindrical lens positioned adjacent the first zone of said first plate to focus radiation transmitted through the first zone of said first plate on the first zone of said second plate, the axis of said first cylindrical lens being parallel to said common plane; a second cylindrical lens positioned adjacent the second zone of said first plate to focus radiation transmitted through the second zone of said first plate on the second zone of said second plate; a line aperture positioned between said first and second plates, the line of said aperture being perpendicular to said common plane; a third cylindrical lens positioned adjacent said first plate to focus radiation transmitted through said first plate through said aperture, the axis of said third cylindrical lens being perpendicular to said common plane; a radiation detector; a double cylindrical lens positioned adjacent said second plate to focus radiation transmitted through said second plate on said detector; and a light opaque plate positioned between said first plate and said second plate, the plane of said light opaque plate being said common plane.

15. The combination in accordance with claim 14 further comprising fourth and fifth cylindrical lenses positioned adjacent and on opposite sides of said aperture, the axes of said fourth and fifth lenses being perpendicular to said common plane.

No references cited.